United States Patent Office 2,873,260
Patented Feb. 10, 1959

2,873,260

UREA-FORMALDEHYDE GAP-FILLING ADHESIVE

John F. Corwin, Pittsburgh, Pa., assignor to Koppers Company, Inc., a corporation of Delaware No Drawing. Application June 16, 1955
Serial No. 516,049

5 Claims. (Cl. 260—17.3)

This invention relates to gap-filling adhesives of the urea-formaldehyde type. More particularly, it relates to improved cold-setting gap-filling urea-formaldehyde adhesives having plasticizing amounts of dimethyl formamide sufficient to afford improved properties to glue lines, particularly craze resistance.

The use of urea-formaldehyde condensates as adhesives is old. Their water-solubility affords a ready and economic use as aqueous solutions. For many purposes a thick glue line is unavoidable. With most known urea-formaldehyde adhesives however, there has been a crazing or cracking of the glue line after curing of thick glue lines, resulting in a weakening of the glued assembly.

It has now been discovered that the addition of dimethyl formamide in the amount of about 31% to about 38%, urea-formaldehyde dry condensate weight basis, overcomes the disadvantages of prior art urea-formaldehyde gap-filling adhesives, particularly as to craze resistance, but also resulting in improved dimensional stability and non-migration or non-disappearance of the novel plasticizer dimethyl formamide. While it is not desired to be bound by any theory, it appears that in this case dimethyl formamide functions as a solvent-plasticizer which is strongly retained by urea-formaldehyde condensates to afford improved gap-filling adhesives.

The urea-formaldehyde condensates useful in these novel gap-filling adhesives are advantageously of the acid-catalyzed type having a molar ratio of urea to formaldehyde of about 1:1.75 to about 1:1.9. Within this range any of the known water soluble urea-formaldehyde condensates are useful. Generally they are used together with organic fillers to increase their consistency, for example, with ground cotton, wood flour, nut shell flour, and the like. The urea-formaldehyde condensates are advantageously used as aqueous solutions, of which the 65% condensate solution has the widest range of application. Greater or lesser concentrations are used as desired for particular purposes.

Conventional acid-reacting or acid-yielding hardeners are used with the gap-filling adhesives, for example, ammonium chloride or ammonium sulfate powder, etc., preferably admixed with an inert diluent such as wood flour. Circa 2% ammonium chloride or equivalent per 100 parts urea-formaldehyde condensate is advantageously used.

The following examples are given for purposes of illustration, parts and percentages being by weight unless otherwise noted:

EXAMPLE 1

Charge:
| | | |
|---|---|---|
| 37% formaldehyde | lb | 335.8 |
| Trisodium phosphate | g | 335.8 |
| 25% phosphoric acid | g | 250.8 |
| Urea | lb | 140 |
| 25% formic acid | g | 208.4 |
| 30% sodium hydroxide | g | 275 |

1. Charge formaldehyde to conventional resin kettle and begin agitation.
2. Add trisodium phosphate and 25% phosphoric acid (pH 7.0–7.2).
3. Add urea.
4. Heat mixture to reflux and continue refluxing until a 35° C. cloud point is reached.
5. Acidify with 25% formic acid to a pH of 5.5–5.7 and change system over to atmospheric dehydration.
6. Remove 50 lbs. water atmospherically.
7. Then change system back to reflux and continue condensation to "C" Gardner-Holdt viscosity.
8. Neutralize with 30% NaOH to a pH range of 7.8 and 8.2 and begin vacuum dehydration.
9. Remove approximately 70 lbs. water, to about 70% solids, keeping reaction mass below 50° C.

Final viscosity, 120+ or −10 R. P. M. Stormer at 77° F.; final pH 7.8–8.2; U:F=1:1.775 molar.

Table I

[Stability of dimethyl formamide-modified resins of U:F=1:1.775.]

| Dimethyl Formamide, Parts /100 Parts 65% Solids Resin | Initial Viscosity [1] | 77° F. Stability, Days to Reach Thickest Usable Viscosity | 100° F. Stability, Days to Gel |
|---|---|---|---|
| 0 | 124(756) | 60 | 21 |
| 15 | 154(599) | 25 | 27 |
| 20 | 156(591) | 30 | 25 |
| 25 | 328(283) | 130 | 38 |

[1] Stormer R. P. M. at 77° F. Figures in parentheses are viscosities in centipoises.

Similar advantageous results with somewhat greater stability of products are obtained when a liquid urea-formaldehyde resin having a molar ratio of U:F of 1:1.75 is substituted for the resin indicated above.

As a relative indication of craze-resistance of thick films of applicant's dimethyl formamide plasticized urea-formaldehyde gap-filling adhesives, 60° glass funnel castings of such resins are made because such castings have progressively wider variations in thickness from apex to base of castings. For their preparation, resin-hardener mixture is poured into a glass funnel, cured at room temperature for 24 hours, and then stored at 77° F. and at 100° F. for observation. Six castings of each modification are made and the tabulated results are averages thereof. All of the castings are "filled" with the same amount of wood flour filler (Solka Fil B), which is an ingredient of the hardener, 16 parts hardener being mixed with 100 parts dimethyl formamide-plasticized resin prior to casting. The hardener consists of a mixture of 13% ammonium chloride, 13% tricalcium phosphate and 74% wood flour, which mixture has been ball milled to a powder. Results follow:

Table II

| U:F [1] | DMF Concentration [2] | Days Stored | Condition at 77° F. | Condition at 110° F. |
|---|---|---|---|---|
| 1:1.775 | 0 | 1 | Crazed | Crazed (1 day). |
| 1:1.775 | 15 | 118 | Not Crazed | Not Crazed. |
| 1:1.775 | 20 | 118 | do | Do. |
| 1:1.775 | 25 | 148 | do | Do. |

[1] Mol. Ratio.
[2] Parts DMF per 100 parts 65% solids resin.

Yellow birch veneer test pieces are prepared and tested for dry, 3½ cycle, dry gap and wet gap (6-hour soak) shear strength, the dry gap and wet gap shear strength being tested pursuant to Canadian specification C-27-484, Cold-Setting Synthetic Resin Glue (Gap-Filling), Dept. of National Defence for Air, Aeronautical Engineering Division, R. C. A. F. The dry veneers (conventional gluings) are tested pursuant to U. S. specification MIL-A-397, while the 3½ cycle is a shear strength test in which conventional gluings are alternately soaked in water at 70° F. and dried at 145° F. for 3½ cycles prior to testing wet. Results follow:

*Table III*

| U:F[1] | DMF Concentration[2] | Hardener | Gluing Results (Shear Lbs./Sq. In.—Percent Wood Failure) | | | |
|---|---|---|---|---|---|---|
| | | | Dry | 3½ Cycle | Dry Gap | Wet Gap |
| 1:1.775 | 25 | As for Table II | 462-92 | 422-32 | 710-41 | 583-35 |
| 1:1.775 | 20 | ----do---- | 414-79 | 317-15 | 579-60 | 412-36 |
| 1:1.775 | 0 | ----do---- | 100% failure before minimum acceptable falling load is applied | | | |

[1] Mol. Ratio.
[2] Parts DMF per 100 parts 65% solids resin.

Similar advantageous results are obtained when a urea-formaldehyde liquid resin having a molar ratio of U:F of 1:1.85 is substituted for the resin used above.

What is claimed is:

1. A craze-resistant, acid-hardenable, gap-filling adhesive comprising a water-soluble urea-formaldehyde condensate, a cellulosic filler to increase the consistency thereof and about 31% to about 38% by weight of dry condensate of dimethyl formamide, the molar proportion of urea to formaldehyde in said condensate ranging between 1:1.75 to 1:1.9.

2. Product of claim 1 containing a hardener chosen from the group consisting of the ammonium salts of sulfuric and hydrochloric acid.

3. Product of claim 1 containing a filler chosen from the group consisting of ground cotton, wood flour, and nut shell flour.

4. Product of claim 1 containing a wood flour filler.

5. Product of claim 1 containing a nut shell flour filler.

References Cited in the file of this patent

UNITED STATES PATENTS

| | | |
|---|---|---|
| 2,535,475 | Anderson | Dec. 26, 1950 |
| 2,689,236 | Webb | Sept. 14, 1954 |

OTHER REFERENCES

Du Pont Product Information, "Dimethyl Formamide," pages 1 and 4, (received in Division 50 on June 3, 1954).